USO05493463A

United States Patent [19]
Hagen

[11] Patent Number: 5,493,463
[45] Date of Patent: Feb. 20, 1996

[54] HEAD ALIGNMENT REFERENCE FEATURE IN A HARD DISK DRIVE HEAD-GIMBAL ASSEMBLY

[75] Inventor: Tracy M. Hagen, Edina, Minn.

[73] Assignee: Seagate Technology, Inc., Scotts Valley, Calif.

[21] Appl. No.: 143,209

[22] Filed: Oct. 26, 1993

[51] Int. Cl.[6] .............................. G11B 5/48; G11B 21/16
[52] U.S. Cl. ............................................. 360/104; 29/603
[58] Field of Search .................................. 360/103, 104, 360/102, 105, 110; 29/603

[56] References Cited

U.S. PATENT DOCUMENTS

| 4,866,836 | 9/1989 | Von Brandt et al. ............... 29/603 |
| 5,115,363 | 5/1992 | Khan et al. ........................ 360/104 |

FOREIGN PATENT DOCUMENTS

| 57-64367 | 4/1982 | Japan ........................... 360/110 |
| 4-89673 | 3/1992 | Japan ........................... 360/103 |

Primary Examiner—Stuart S. Levy
Assistant Examiner—William J. Klimowicz
Attorney, Agent, or Firm—Edward P. Heller, III

[57] ABSTRACT

A visual head alignment reference feature for determining the correct alignment of the slider body of a head relative to the load point of the gimbal which forms a portion of a hard disc drive head/flexure assembly. The head alignment reference feature includes laterally and longitudinally extending edges whose lengths define the allowable range of variation in slider placement along the respective axes. In a preferred embodiment, a laterally opposed pair of reference features are located on both lateral sides of the gimbal, enabling skew misalignment of the slider relative to the gimbal to be detected.

1 Claim, 7 Drawing Sheets

HEAD ALIGNMENT REFERENCE FEATURE IN A HARD DISK DRIVE HEAD-GIMBAL ASSEMBLY

FIELD OF THE INVENTION

This invention relates generally to the field of hard disc drive data storage devices, and more particularly, but not by way of limitation, to an apparatus for visually determining the correct alignment of the head and gimbal in a head/flexure assembly in a hard disc drive data storage device.

BRIEF DESCRIPTION OF THE PRIOR ART

Disc drive data storage devices, or disc drives, of the type known as "Winchester" disc drives are well known in the industry. In such devices, one or more flat rigid discs coated with a magnetizable medium are mounted on a spindle motor for rotation at a closely controlled high rate of speed. An array of heads, typically one per disc surface, is carried by some sort of actuator, which moves the heads to any desired one of a large number of circular, concentric tracks on the disc surfaces.

In these types of disc drives, the typical head consists of a slider body, or slider, which includes a self-acting hydrodynamic air bearing surface and carries a magneto-electric transducer. The self-acting hydrodynamic air bearing interacts with a thin layer of air dragged along by the rapidly spinning disc to "fly" the transducer at a precisely determined height above the disc surface. Electrical signals to and from the transducer are carried via very small twisted copper wires.

The distance between the head and disc, or "flying height", of currently available products is commonly less than 10 microinches (10 μinches or 0.000010 inches) and some products utilize heads flying at 4 μinches or less. This decrease of the flying height is part of the reason for the rapidly increasing storage capacity of disc drive products, as well as the diminishing physical size of disc drives.

In order to allow the flying characteristics of the head to conform to minor variations in the surface of the discs, the heads are mounted in the disc drive using a flexure, also called a head suspension or a head flexure. Such flexures consist of two major components:

1. A gimbal, which is attached to the head and is resilient in the slider's pitch and roll axes to allow the head to follow the topography of the disc, and is rigid in the yaw and in-plane axes to maintain precise head positioning, and;
2. A load beam, which is attached to the gimbal and to the actuator which moves the heads. The load beam is again resilient in the vertical axis to allow the head to follow the topography of the disc, and is rigid in the in-plane axes for precise head positioning. The load beam also serves to provide a "downward" force—toward the disc—that precisely counterbalances the hydrodynamic lifting force of the slider's air bearing.

An example of this type of flexure assembly is described in U.S. Pat. No. 4,167,765 (Watrous). In such flexures the downward force of the load beam is generally applied against a protrusion on the gimbal. The protrusion, also referred to as a load point or dimple, is commonly hemispherical in shape and is located on a portion of the gimbal typically referred to as the tongue, which is usually bonded to the slider with an epoxy adhesive.

It is well known in the industry that, to achieve the correct flying attitude—i.e., flying height, pitch and roll of the slider—it is essential that the slider be precisely positioned relative to the load point. Errors in alignment of the slider with respect to the load point can result in the slider having undesirable flying characteristics, which can cause a degradation of the signal quality to and from the transducer, or, in extreme cases, can cause the slider to contact the disc surface, potentially fatally damaging the head, disc or both. Such damaging contact is often referred to as a "head crash".

Various means for determining correct head/gimbal alignment exist. For instance, U.S. Pat. No. 4,866,836 (Brandt, et al.) discloses a vision system which can be employed to accurately find the load point of the flexure, and then to precisely locate the slider relative to the load point. Such systems, however, are expensive and have low throughput, making them unsuitable for high-volume mass production applications.

In general, high-volume mass production of head/gimbal assemblies employs assembly fixtures which have a spring-loaded pocket to receive the slider. Adhesive is applied to the gimbal tongue of the flexure sub-assembly and the flexure is then placed on the assembly fixture. Locating pins on the assembly fixture ensure accurate positioning of the flexure relative to the slider. Clamps or weights are then used to urge the flexure against the slider while the adhesive is cured. Unfortunately, the assembly fixtures do not always provide accurate alignment of the slider to the flexure.

For instance, contamination, such as residual adhesive, can find its way onto the reference edges of the slider pocket in the assembly fixture. This prevents the slider from correctly seating in the pocket and creates alignment error. Similarly, nicks or burrs, created by careless handling of the assembly fixture, which are located near the slider pocket will also prevent the slider from seating properly, and cause alignment error.

A third potential source of alignment error are the fixture pins used to position the flexure. These pins typically cooperate with features on the load beam portion of the flexure, while the load point is a gimbal feature. This means that error in the alignment of the gimbal to the load beam during flexure assembly—specifically, the load beam-to-gimbal welding process—will result in alignment error between the slider and load point.

When head/flexure assemblies are manufactured, the operators responsible for the bonding of the flexure to the slider strive to ensure that the slider is properly seated in the assembly fixture. Unfortunately, it is difficult to visually examine the slider after the flexure has been mounted to the assembly fixture. This makes it impossible to be certain that correct alignment exists before the adhesive has cured. Verification that the alignment is within specification has to wait until the adhesive is cured and the completed head/flexure assembly is removed from the assembly fixture. As a consequence, head/flexure assemblies that are out of alignment specification are difficult, if not impossible, to rework, resulting further in high scrap costs.

Furthermore, confirming that the alignment of the slider and flexure is within specification typically requires the use of vision based metrology systems similar to that described in the above-cited U.S. Pat. No. 4,866,836 patent. Again, such systems, while very accurate, are expensive and slow, and, while able to provide highly accurate determination of the exact location of the slider relative to the load point, may provide more precision than is strictly necessary in a high-volume mass production environment. That is, in a production environment, it may be more valuable to know simply whether or not the assembly is within specification than to know the exact location of the slider relative to the load point. Descriptive statistics, such as average, standard deviation and process capability, can be acquired through statistical process control sampling, which can more easily make use of in-spec/out-spec information than it can the precise measurements afforded by these types of visual metrology systems.

Therefore, it would be highly desirable to provide a simple, inexpensive apparatus for determining whether the alignment between sliders and flexures is within a predetermined specified range, and it would be further desirable if such an apparatus lent itself easily to a high-volume mass production environment.

SUMMARY OF THE INVENTION

The present invention provides a gimbal with integral features suitable for visual confirmation of acceptable slider-to-load point alignment. These features are generally in an L-shape, with one edge extending laterally and the other edge extending longitudinally relative to the flexure. The length of the edges of the features is selected to define an allowable range for correct alignment of the slider to the load point, and a properly aligned slider will expose a corner of the slider within the extent of the edges of the feature.

In the preferred embodiment, the alignment features are formed when the gimbal itself is formed.

It is an object of the invention to provide a gimbal for a head/flexure assembly which will eliminate the need of high-cost, low-throughput visual metrology to determine proper alignment of slider and load point in the head/flexure assembly.

It is another object of the invention to provide a gimbal for a head/flexure assembly in which the determination of correct alignment of the slider relative to the load point is accomplished by a quick simple visual check.

It is another object of the invention to provide a gimbal for a head/flexure assembly with features that enable assembly operators to confirm correct alignment of the slider relative to the load point before the adhesive that bonds the slider to the gimbal has cured, thereby alerting the operator to the possibility of a corrupted assembly fixture or careless loading of the fixture, enabling the operator to take corrective action at the earliest possible point in the manufacturing process, resulting in reduced faulty assemblies and reduced scrap costs.

The features, benefits and objects of the invention can be best understood from the following detailed description of the invention and from the appended claims when read in conjunction with the following drawings.

DETAILED DESCRIPTION OF THE INVENTION

Figure 1:
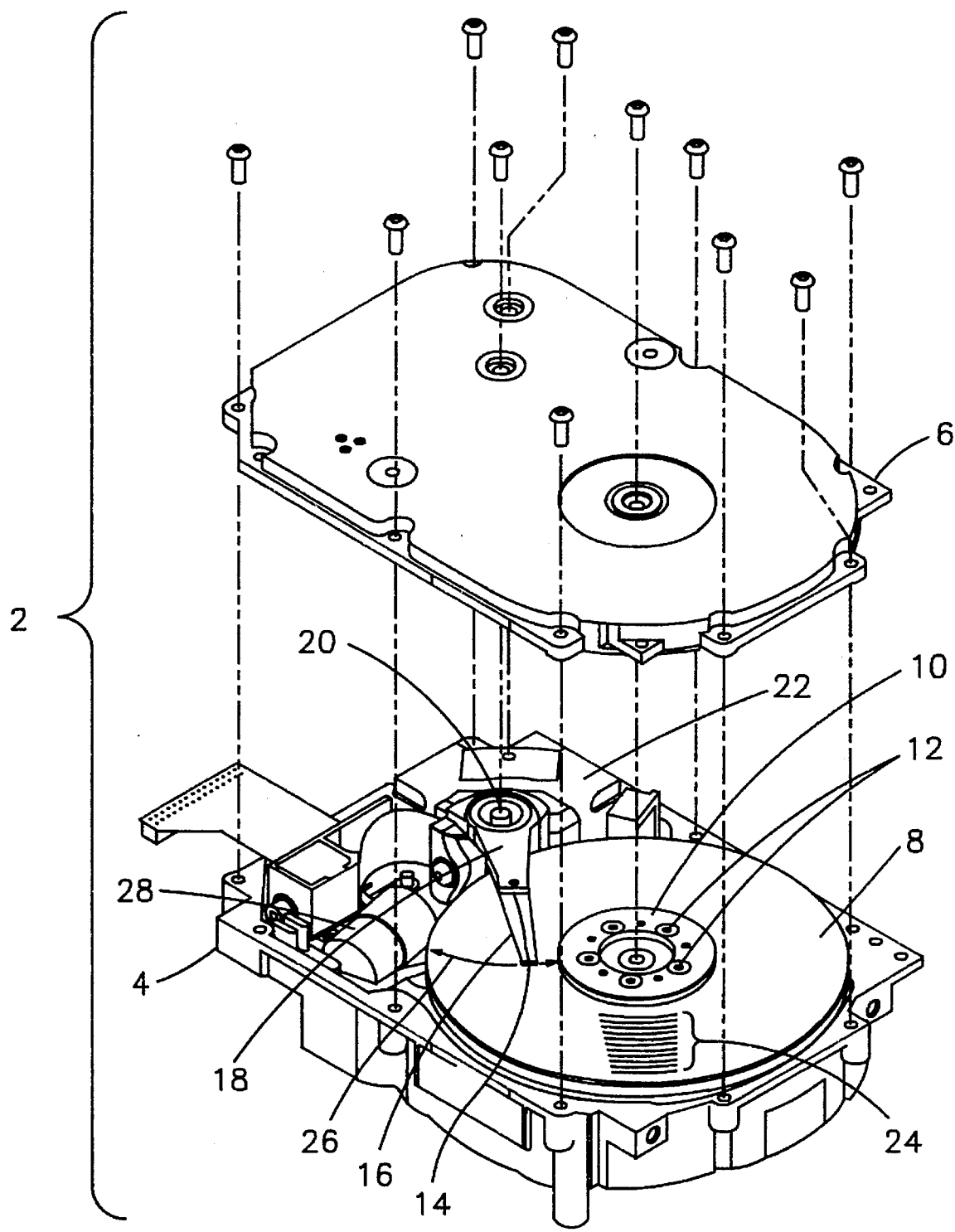
FIG. 1 is a partially exploded isometric view of a disc drive in which the present invention is particularly useful.

Turning now to the drawings and more particularly to FIG. 1, shown is a partially exploded isometric view of a disc drive 2 of the type in which the present invention is particularly useful. The disc drive 2 includes a housing base 4 and a top cover 6 which cooperatively engage to form a sealed housing which serves to protect delicate internal components from external contaminants.

At least one disc 8 is mounted for rotation on a spindle motor hub (not shown) using a disc clamp 10. In this example, the disc clamp 10 is secured using screws 12 equally spaced about the perimeter of the disc clamp 10. An array of heads (one shown at 14) is mounted via flexure assemblies 16 to an actuator body 18 which is adapted for rotation about a pivot shaft 20 under control of an actuator motor, shown generally at 22.

The actuator motor 22 is driven by electronic circuitry (not shown) to controllably move the heads 14 to any desired one of a plurality of concentric circular tracks 24 on the discs 8 along arcuate path 26.

Figure 2:
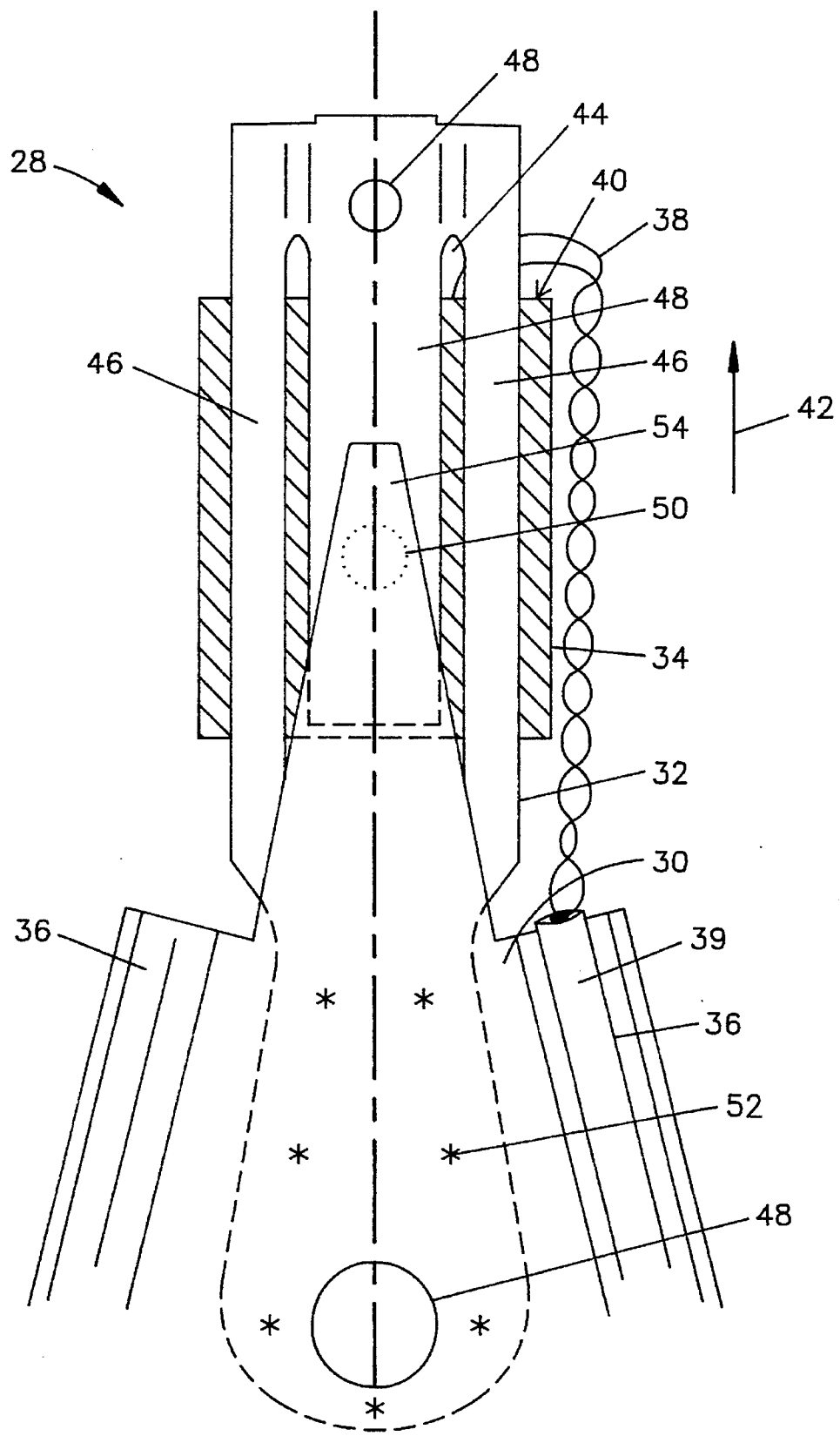
FIG. 2 is a plan view of a portion of a prior art head/flexure assembly.

FIG. 2 is a plan view of a portion of a head/flexure assembly 28 of the type common in the prior art, and consists of three major components: a load beam 30, for applying a "downward" force toward the disc; a gimbal 32; and, a slider body 34, sometimes also referred to as a slider.

The load beam 30, partially shown in FIG. 2, is typically formed of sheet stainless steel 0.003 inches thick using the process of photoetching, and includes a pair of channels 36 formed along its lateral edges. These channels 36 increase the stiffness of the load beam 30 in the in-plane axes, and one also serves as a guide path for a pair of very thin copper wires 38, which pass through protective tubing 39 and carry electrical signals to and from the transducer (not shown) which is fabricated on the trailing edge 40 of the slider body 34. In the type of head/flexure assembly shown, the direction of disc rotation is in the direction of arrow 42.

The gimbal 32 is typically formed of 0.0015 inch thick stainless steel again by the process of photoetching. This photoetching produces a "U"-shaped opening 44 in the gimbal 32, which separates the gimbal 32 into a pair of gimbal arms 46, which allow the necessary compliance for proper flying of the slider body 34, and a tongue 48, which serves as the mounting surface for the slider body 34.

After photoetching, the gimbal 32 is stamp-formed before attachment to the load beam 30. This stamped-forming creates a hemispherical dimple 50, which extends upward (away from the slider 34, when mounted) and forms the load point about which the slider 34 is allowed a small amount of pitch and roll compliance. During the same stamping process that forms the dimple 50, the tongue 48 of the gimbal 32 is displaced downward (toward the slider 34, when mounted) out of plane from the remainder of the gimbal 32. This downward displacement is substantially the same dimension as the height of the dimple 50.

The gimbal 32 is then aligned with the load beam 30 in an assembly fixture (not shown) using tooling holes 48A (in the gimbal 32), and 48B (in the load beam 30) and is welded to the load beam at a number of places, as represented by starred locations 52. Once this welding is completed, the very top of the dimple 50 should be in contact with the lower surface of the load beam 30, and the tongue 48 should be substantially parallel to the load beam 30 and the gimbal arms 46.

Once the load beam 30 and gimbal 32 have been welded together and the slider body 34 has been adhesively attached to the tongue 48 of the gimbal 32, it is extremely difficult to ascertain the exact location of the topmost point of the dimple 50 relative to the slider body 34, since the dimple 50 is hidden under the distal end 54 of the load beam 30. It is this difficulty that the present invention is intended to overcome.

Figure 3:
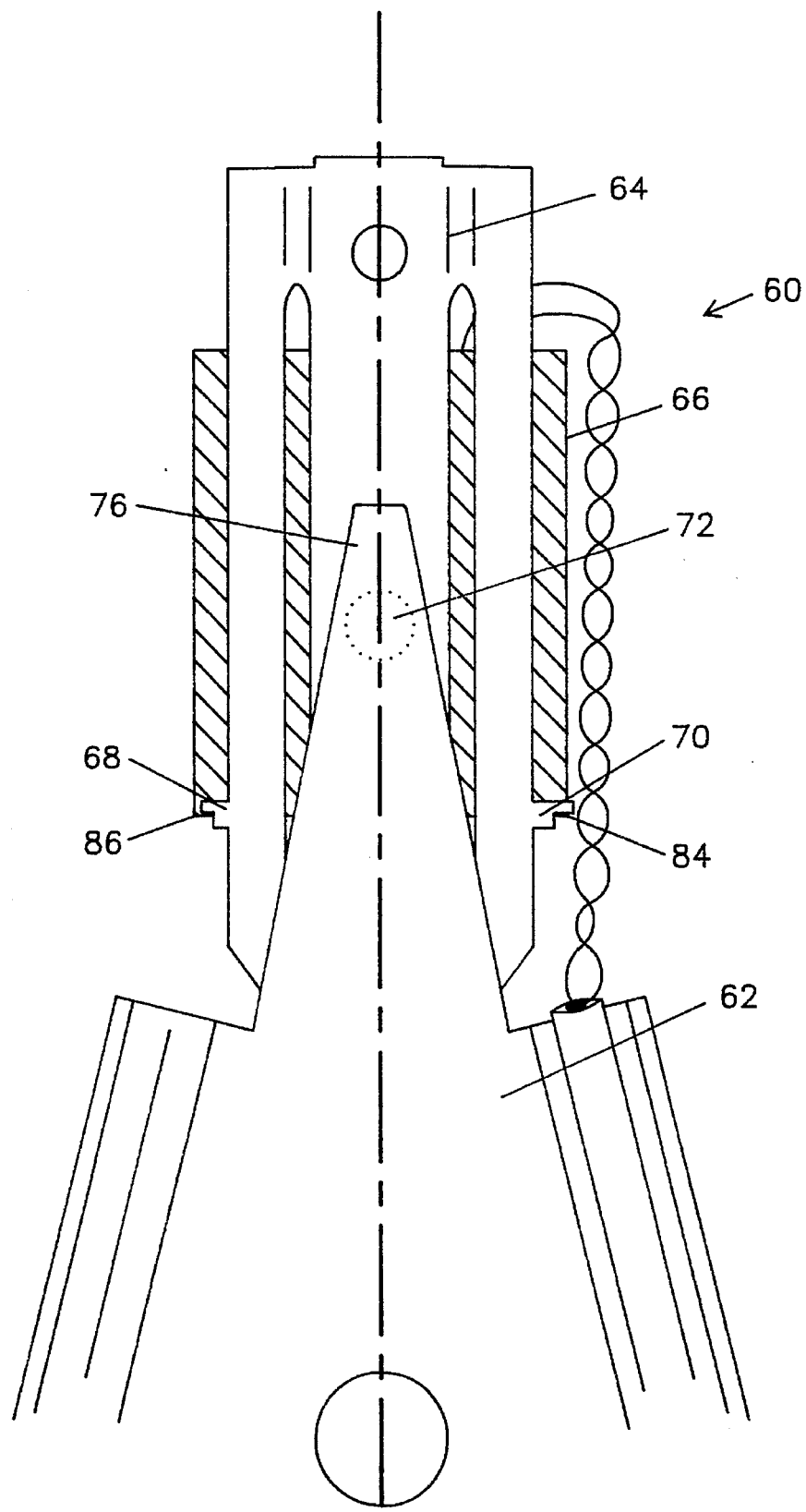
FIG. 3 is a plan view of a portion of a head/flexure assembly made in accordance with the present invention.

Turning now to FIG. 3, shown is a partial plan view, similar to that of FIG. 2, of a head/flexure assembly 60 made in accordance with the present invention. The head/flexure assembly 60 consists of a load beam 62, a gimbal 64 and a slider body 66 assembled together as described above in relation to FIG. 2. The major difference between the prior art of FIG. 2 and the inventive head/flexure assembly of FIG. 3 is the inclusion of a pair of reference features 68, 70 which can be used to easily determine by visual inspection the correct placement of the slider body 66 relative to a load point (not designated) where the top of the dimple 72, which is formed in the tongue 74 of the gimbal 64, contacts the lower surface of the distal end 76 of the load beam 62.

Figure 4:
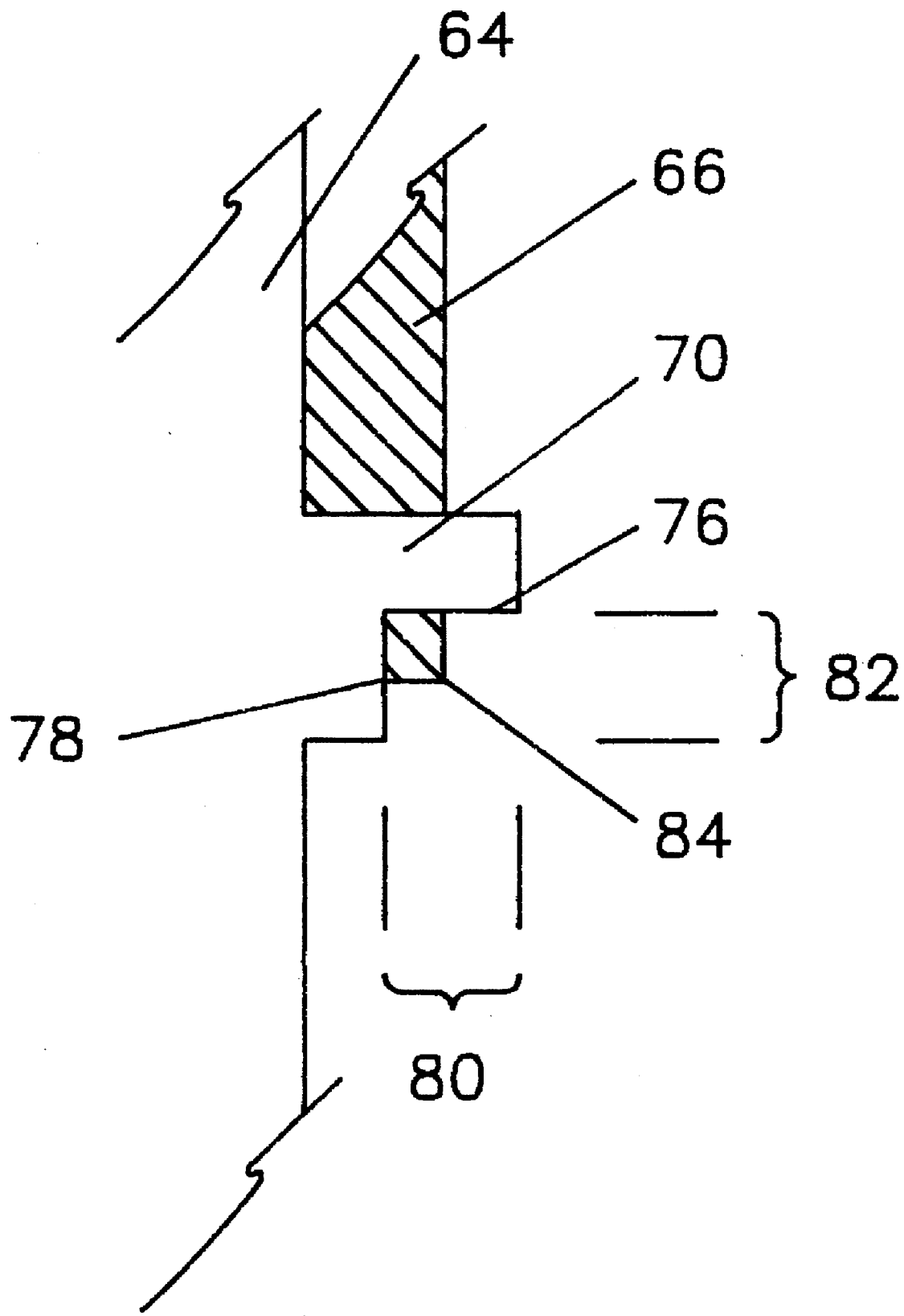
FIG. 4 is an enlarged detail view of a portion of the head/flexure assembly of FIG. 3.

The function of the invention is best shown in FIG. 4, which is an enlarged detail view of the reference feature 70 of FIG. 3, along with a partial view of the gimbal 64 and slider body 66. Reference feature 70 is integrally formed with the gimbal 64, preferably using the same etching process used to form the gimbal. The reference feature 70 includes a laterally extending edge 76 and a longitudinally extending edge 78 meeting at substantially a right angle. The lateral dimension 80 and longitudinal dimension 82 of these edges 76, 78 is equal to the maximum range of allowable displacement of the slider body 66 in the lateral and longitudinal axes, respectively. When the slider body 66 is mounted to the gimbal 64 correctly, a corner 84 of the slider body 66 will lie within the extent of the lateral and longitudinal edges 76, 78 as shown in FIG. 4. If the corner 84 of the slider body 66 does not lie within the extent of the lateral and longitudinal edges 76, 78, the assembly would be considered to be "out-of-spec", and rejected following a visual inspection.

Figure 5A:
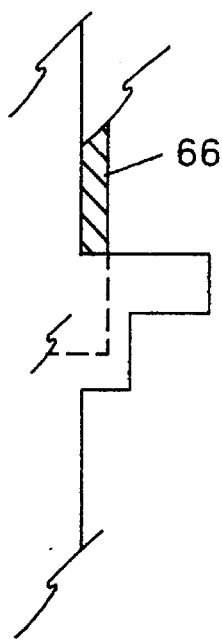
FIGS. 5a through 5f are examples of misalignment of head/flexure assemblies, as revealed by the present invention.
Figure 5B:
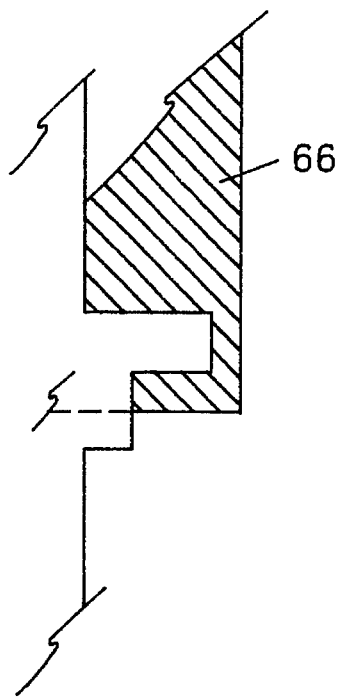
Figure 5C:
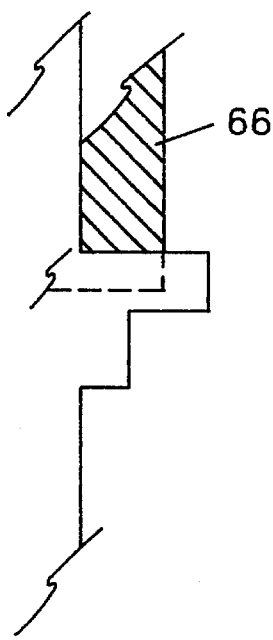
Figure 5D:
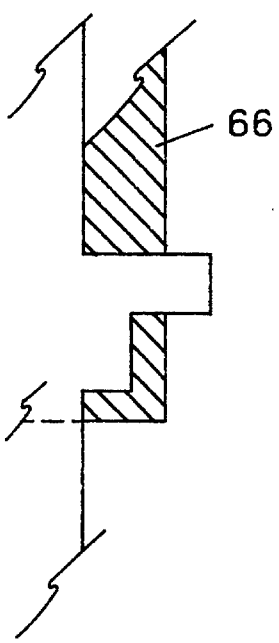
Figure 5E:
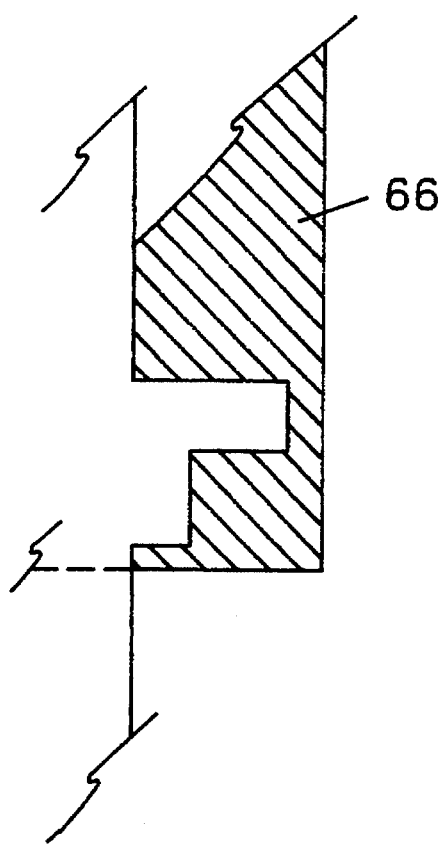
Figure 5F:
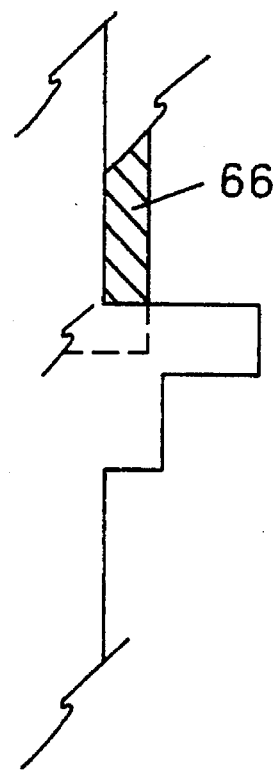

Several examples of incorrect slider body placement are shown in FIGS. 5a through 5f, which are detail partial plan views similar to FIG. 4. Specifically, FIGS. 5a and 5b show assemblies in which the longitudinal placement of the slider body 66 is proper, while the lateral position of the slider body 66 is incorrect, being too far to the left and right in FIGS. 5a and 5b, respectively. FIGS. 5c and 5d show slider bodies 66 which are correctly positioned in the lateral axis, but not in the longitudinal axis, and FIGS. 5e and 5f show slider bodies 66 which are incorrectly positioned in both the lateral and longitudinal axes. A comparison of any of the "out-of-spec" examples of FIGS. 5a– 5f with the correct slider body placement example of FIG. 4 will show that visual verification of the proper positioning of the slider body 66 relative to the gimbal 64 is a simple operation using the reference feature of the present invention.

Returning now to FIG. 3, another aspect of the present invention is also shown. As previously mentioned above, the gimbal 64 includes a pair of reference features 68, 70 located on the lateral sides of the gimbal 64. An examination of the right reference feature 70 shows correct placement of the slider body 66, as explained above in relation to FIG. 4.

However, looking at the left reference feature 68 seems to reveal that the slider body 66 is incorrectly placed relative to the gimbal 64. It is a well known practice in the industry to laterally offset the slider body 66 relative to the gimbal 64. This is done based on whether the head/flexure assembly is intended for use on the "upper" or "lower" surface of the disc. Slight differences in the linear velocity of the disc relative to the inner and outer edges of the slider body 66 will cause the slider body 66 to tilt if the load point, where "downward" force is applied to the slider body 66, is located exactly on the longitudinal centerline of the slider body 66. By laterally offsetting the slider body 66, this tendency to tilt is eliminated, and—since the "inward" and "outward" directions are opposite for "top" and "bottom" heads—this lateral offset must also be applied in opposite directions for the two head types.

In the preferred embodiment of the present invention, the gimbal 64 with its associated reference features 68, 70 is symmetrical about its longitudinal axis. This means that, in a properly assembled head/flexure assembly, only one corner 84 of the slider body 66 will be located both laterally and longitudinally within the angle formed by the laterally and longitudinally extending edges 76, 78 of one reference feature 70, while the laterally opposite corner 86 of the slider body 66 will display correct longitudinal position, but incorrect lateral position. This fact is also useful for providing a simple visual indication of the side of the disc on which a given head/flexure assembly should be mounted.

Figure 6:
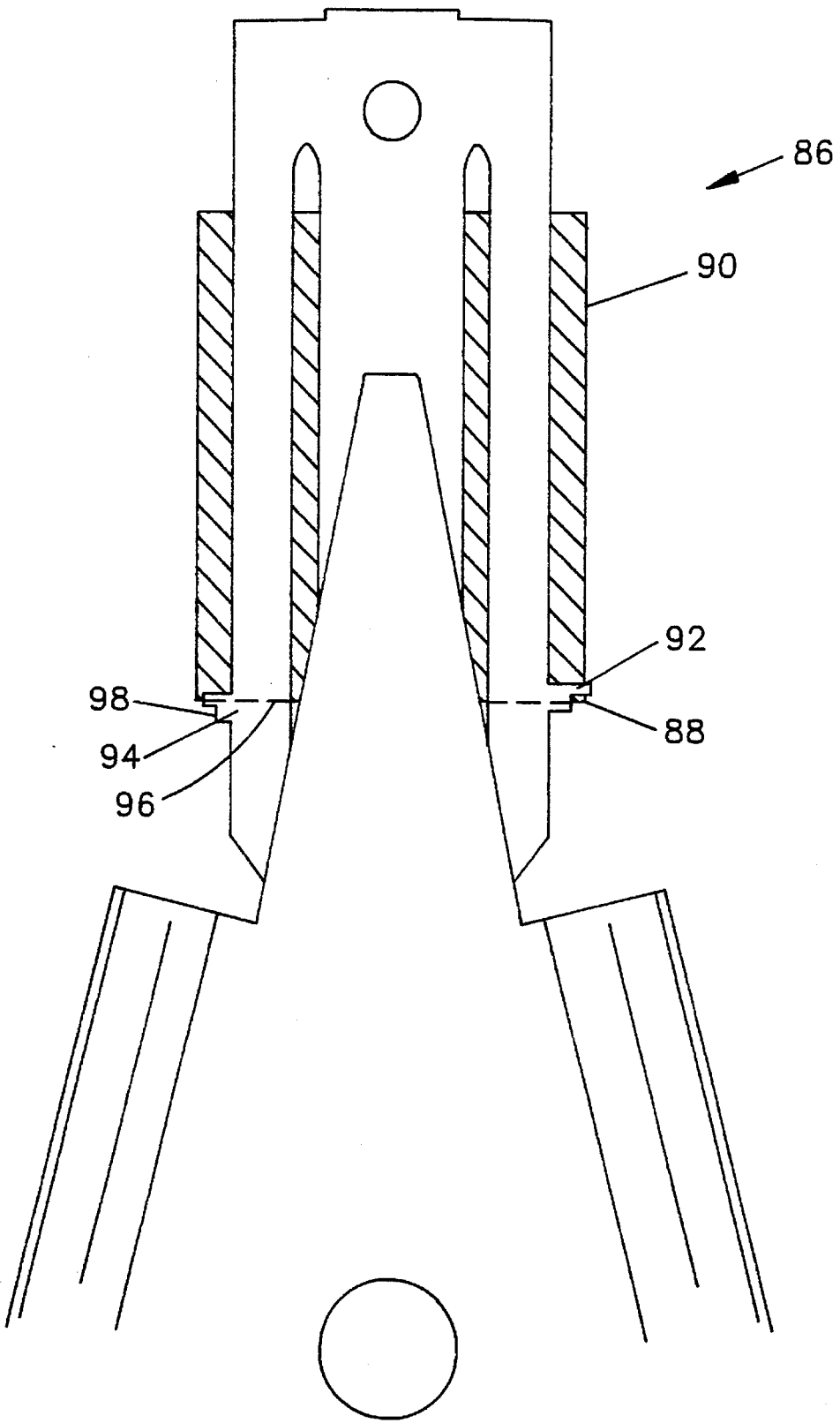
FIG. 6 is a plan view of a portion of a head/flexure assembly made in accordance with the present invention and showing another type of misalignment detectable using the present invention.

Another advantage of the configuration of reference features shown in FIG. 3 is that they provide a visual indication of proper "skew" alignment between the slider body 66 and the gimbal 64. That is, if the slider body 66 were incorrectly positioned about a vertical axis relative to the gimbal 64, such an error would be clearly indicated since the assembly would not show the proper longitudinal position in both reference features. Such an incorrectly assembled head/flexure assembly 86 is shown in FIG. 6. In FIG. 6, it can be seen that one corner 88 of the slider 90 is visible within the range of the laterally and longitudinally extending edges (not designated) of the right reference feature 92, apparently indicating a proper assembly. An examination of the left reference feature 94, however, shows that the leading edge 96 of the slider 90 does not lie within the acceptable longitudinal range, as defined by the longitudinally extending edge 98 of the left reference feature 94. This is because the slider 90 has been slightly skewed in the clockwise direction, a condition which would be difficult to detect without the reference features of the present invention. With the present invention, however, it is a simple matter to visually detect this type of incorrect slider positioning.

While a particular configuration of head alignment reference feature has been shown herein, it may become apparent to one skilled in the art that other types of features may achieve a similar purpose. For instance, the lateral and longitudinal edges may form portions of a closed opening, or hole, in a tab near the outer edge of the gimbal.

It will be clear that the present invention is well adapted to carry out the objects and attain the ends and advantages mentioned as well as those inherent therein. While a presently preferred embodiment has been described for purposes of this disclosure, numerous changes may be made which will readily suggest themselves to those skilled in the art and which are encompassed in the spirit of the invention disclosed and as defined in the appended claims.

What is claimed is:

1. A visual head-gimbal alignment apparatus comprising:
   a gimbal integral to a distal end of an elongated load beam, the gimbal having a pair of extreme lateral edges defining substantially the greatest lateral extent of the gimbal, the edges being substantially aligned in a longitudinal direction with the longitudinal axis of the elongated load beam;

a substantially rectangular magnetic head slider having four corners in plan view, the slider mounted on one side of said gimbal, the gimbal and slider being so arranged that the center of the slider is located between the lateral edges of the gimbal and said corners are located laterally beyond said gimbal lateral edges so as to be visually perceptible when viewed from the side of the gimbal opposite the side on which the slider is mounted; and at least two visual indication means mounted on opposite of said lateral edges of said gimbal for visually aligning at least two of the four slider corners.

* * * * *